United States Patent [19]
Mortier et al.

[11] 3,848,609
[45] Nov. 19, 1974

[54] AXIAL FLOW TYPE HARVESTING MACHINES

[75] Inventors: Frans H. Mortier, Maldegem; Gerard O. Jacobs, Ichtegem; Frans J. G. C. Decoene, Zedelgem; August Braet, Beernem, all of Belgium; Edward W. Rowland-Hill, Lancaster, Pa.

[73] Assignee: Clayson N. V., Zedelgem, Belgium

[22] Filed: June 29, 1972

[21] Appl. No.: 267,268

[30] Foreign Application Priority Data
July 6, 1971 Great Britain .................. 31576/71
Sept. 21, 1971 Great Britain .................. 43973/71

[52] U.S. Cl. .......................... 130/27 T, 130/27 HA
[51] Int. Cl. ........................................... A01f 7/06
[58] Field of Search ............ 130/27 R, 27 HA, 27 T

[56] References Cited
UNITED STATES PATENTS

| | | |
|---|---|---|
| 1,682,374 | 8/1928 | Gilman .................................. 130/6 |
| 1,853,784 | 4/1932 | Stevens ........................... 130/27 HA |
| 2,053,148 | 9/1936 | James ................................ 130/27 T |
| 2,266,806 | 12/1941 | Ronning ......................... 130/27 HA |
| 3,529,645 | 9/1970 | Murray et al. .................... 130/27 T |
| 3,589,111 | 6/1971 | Gullickson et al. ............... 130/27 T |
| 3,664,100 | 5/1972 | Rowland-Hill .................... 130/27 T |
| 3,669,122 | 6/1972 | Rowland-Hill .................... 130/27 T |

*Primary Examiner*—Antonio F. Guida
*Attorney, Agent, or Firm*—Louis J. Virelli, Jr.; Frank A. Seemar; John R. Flanagan

[57] ABSTRACT

The invention comprises axial flow type threshing and separating rotor means for harvesting machines, more especially combine harvesters of the type having generally fore-and-aft extending threshing and separating means, wherein at least one threshing concave and separating grate cooperable with the rotor is provided; the rotor having a generally cylindrical body portion from the surface of which extends at least one threshing member and a separating member for operating on the crop material to be harvested and a casing wherein the rotor is provided.

18 Claims, 13 Drawing Figures

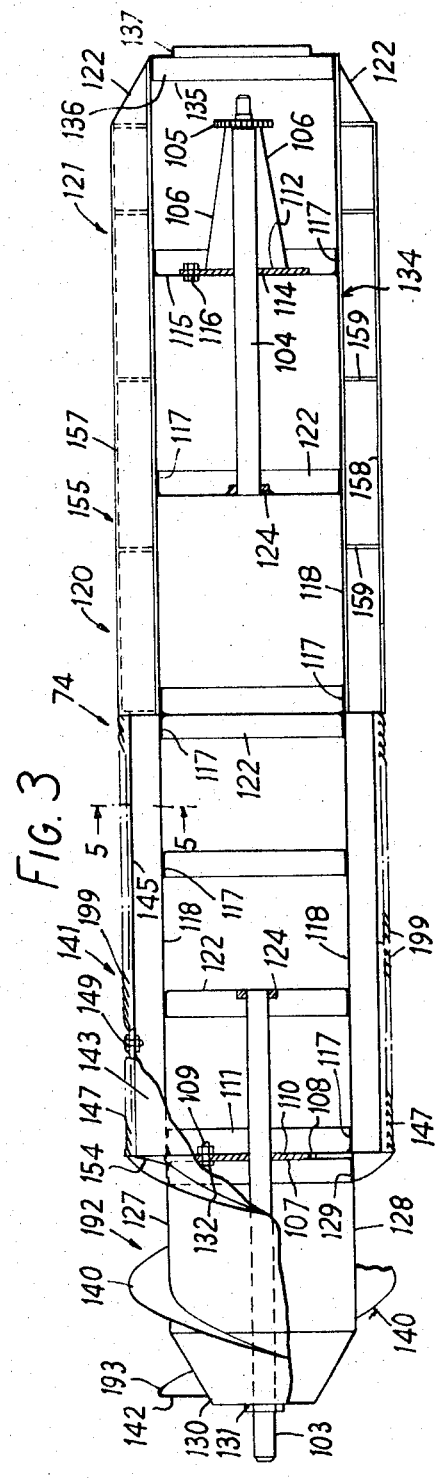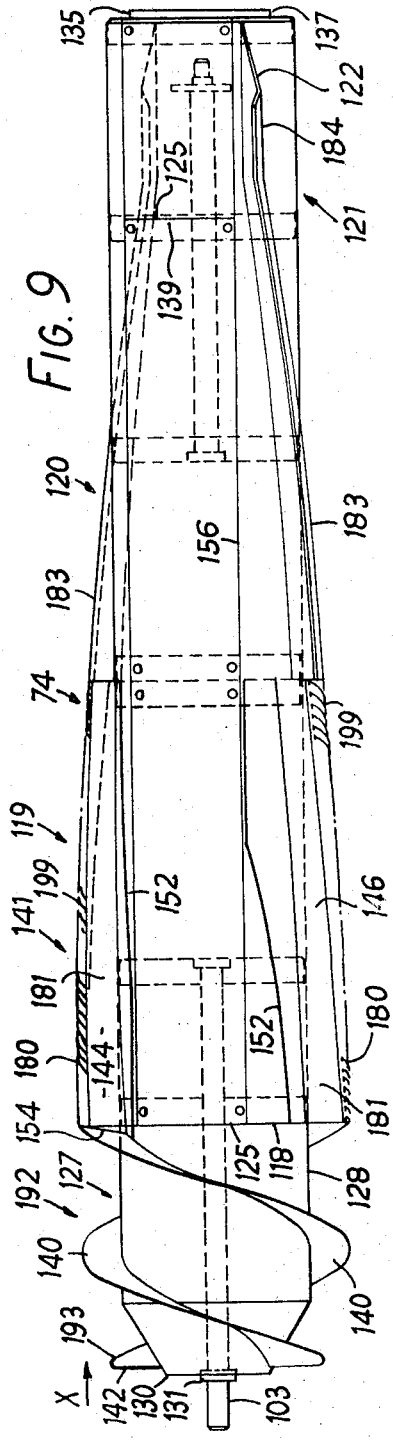

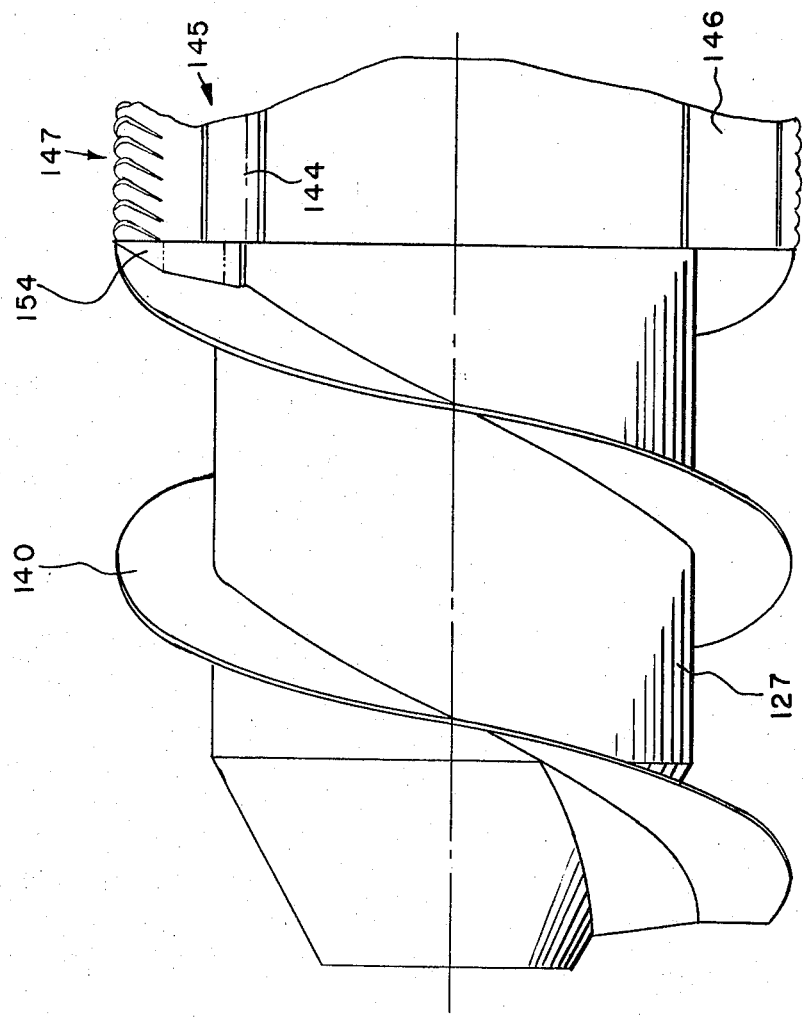

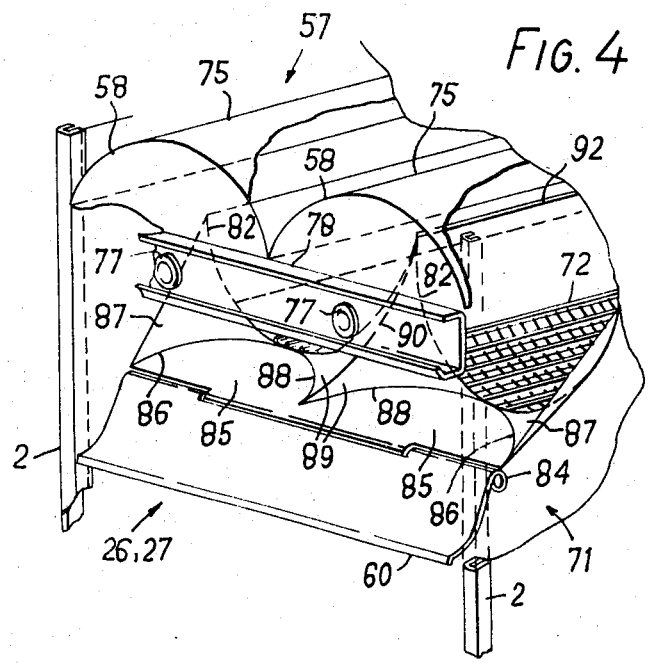

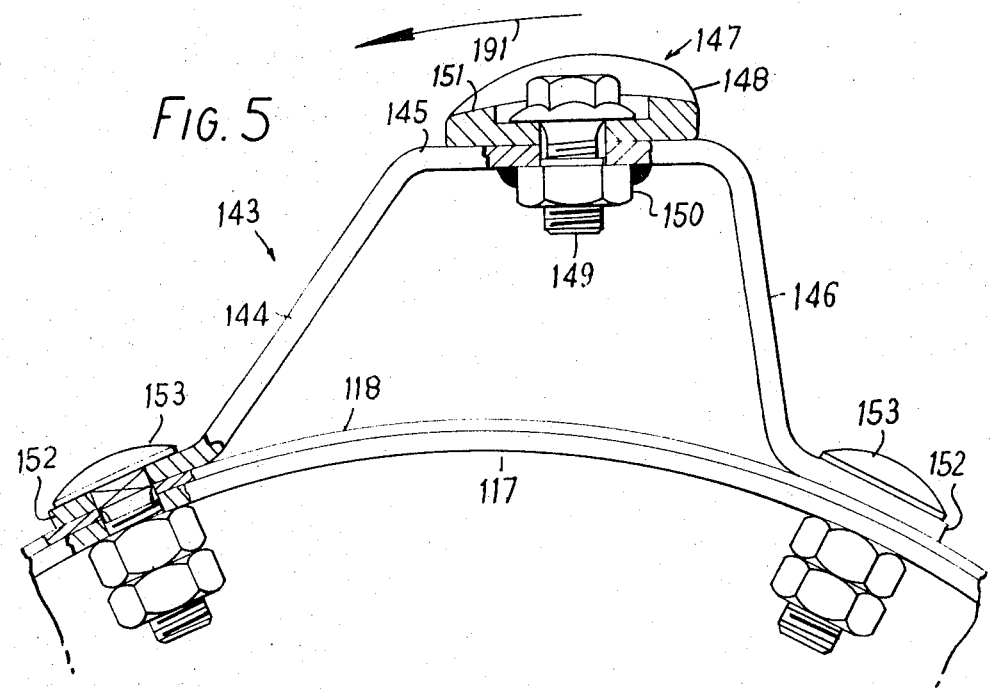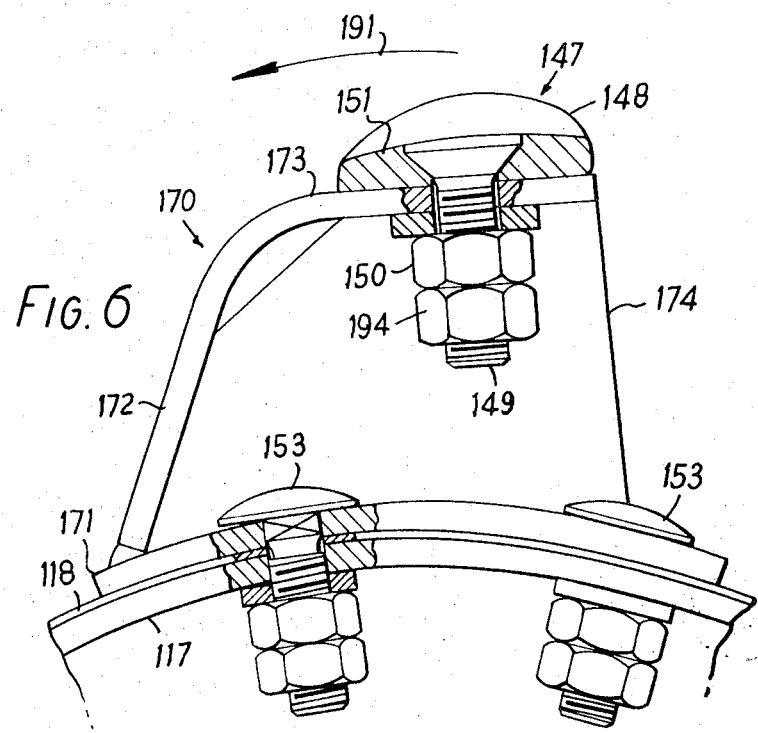

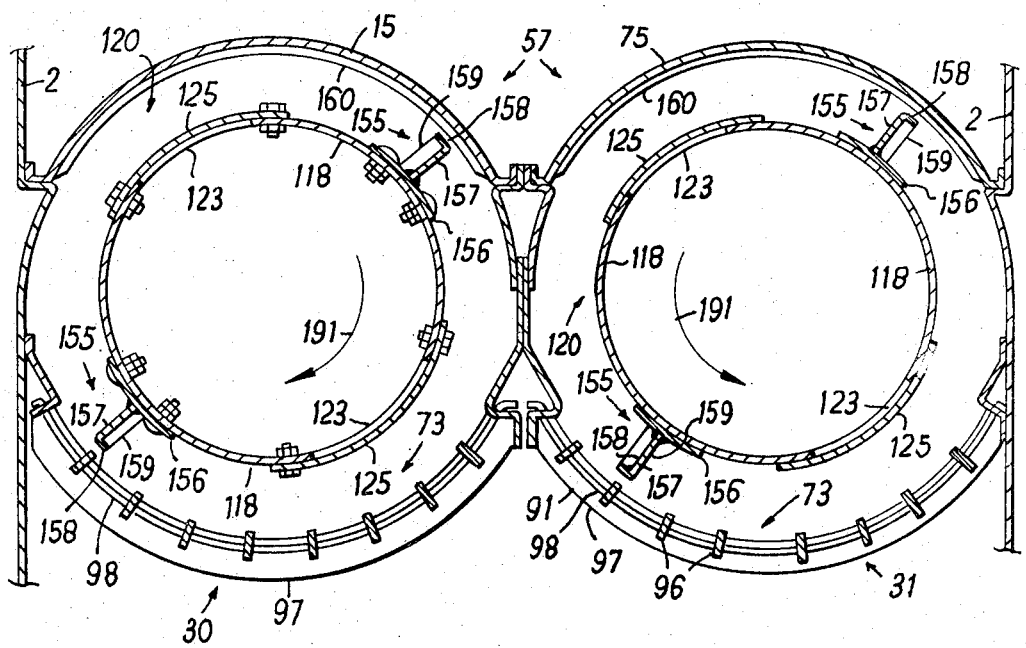
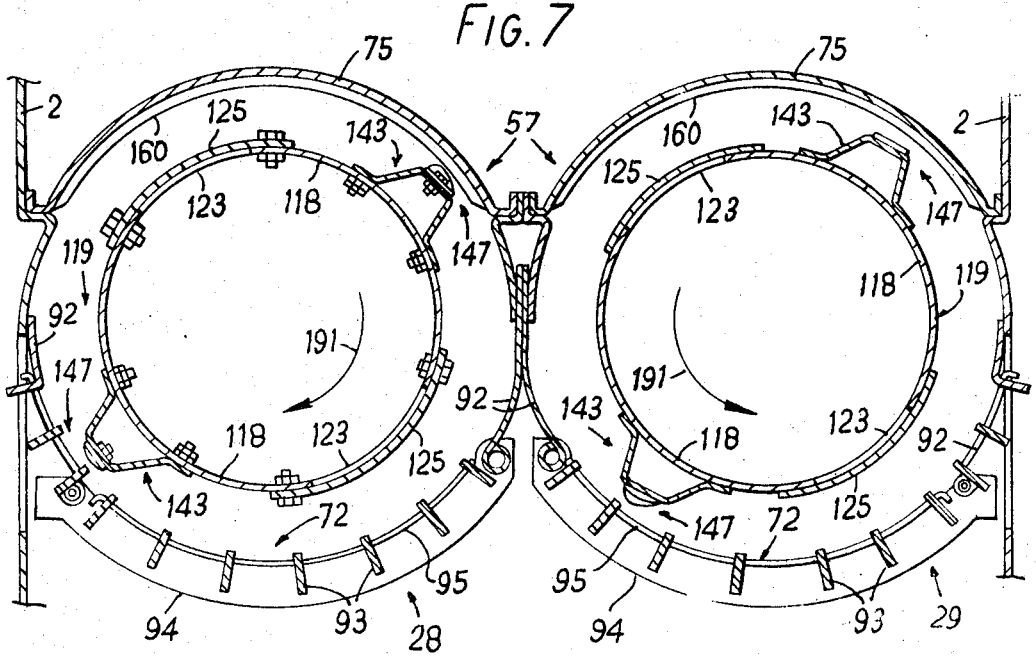

AXIAL FLOW TYPE HARVESTING MACHINES

BACKGROUND OF THE INVENTION

1. Field of the Invention

The present invention relates to axial flow harvesting machines and more particularly, although not exclusively, to axial flow combine harvesters (also referred to hereafter as combines).

In a combine harvester, the grain is threshed, separated and stored for subsequent transport from the field and this is considered to be the most economical method of harvesting crop material. In the standard commercially available combines, the rotatable threshing cylinder and cooperable concave extend transversally to the direction of movement of the combine. The crop is fed to the concave and passed between the concave and threshing cylinder whereby it is threshed over a comparatively short distance, a typical concave extending over about 100° with respect to the cylinder. The straw is discharged rearwardly of the concave onto reciprocating or oscillating straw walkers that extend longitudinally of the combine. Much of the grain contained in the crop material fed to the threshing mechanism is threshed and separated by that mechanism while some of the remainder is separated from the straw whilst the latter is on the straw walkers.

The present invention relates to harvesting machines having a threshing and separating mechanism different from that of the standard combine discussed above; the threshing and separating mechanism extends generally longitudinally (fore-and-aft) of the machine; generally parallel to the direction of movement in the case of a combine harvester, and comprises a rotor and a casing. Two such threshing and separating mechanisms may be employed, disposed side-by-side, and a combine having this twin arrangement is disclosed in U.S. Pat. No. 3,742,686 granted July 3, 1973. The crop material is fed to the forward end of the threshing and separating mechanism and is formed into a mat which passes generally spirally in axial direction therethrough, hence the name axial flow type combines or harvesting machines.

2. Description of the Prior Art

In axial flow machines, the crop material is subjected to a threshing and separating action for longer than in a standard machine of comparable size and, therefore, the efficiency of the former is greater than the efficiency of the latter as the grain losses are reduced but this of itself has to date not proved to be an overriding advantage. Some of the problems associated with axial flow machines are that the power requirement is greater than with a comparable standard machine due to the sustained threshing and separating and it is not always possible to cope with every condition and type of crop material which may be encountered.

It will be appreciated that a harvesting machine must be able to handle a range of crop material and all conditions of such crop material without necessitating major adjustment or replacement of components if it is to be a practicable, and therefore commercial, proposition. Also, grain losses must be kept to an acceptable minimum. Another difficulty of known or proposed axial flow machines resides in the maintaining of the smooth flow of crop material through the threshing and separating mechanism. It only requires a relatively small amount of crop material or a piece of foreign material to cease moving through the mechanism for a major obstruction soon to accumulate resulting in a jamming or breakdown.

Yet other problems are the wrapping of crop material around the rotor(s) of the threshing and separating mechanism, again resulting in jamming or breakdown, and the overloading of the grain cleaning mechanism due to the production of a relatively large amount of short pieces of straw. The latter problem arises mainly due to the provision of spiral fins in the casings housing the rotors of the threshing and separating mechanisms, which fins in conjunction with the rotors serve to move the crop material generally axially of the threshing and separating mechanism but also act as knives and sever the straw into small pieces.

It has been proposed in the prior art to provide an axial flow combine with a threshing and separating rotor comprising a central core extending fore-and-aft of the machine, a plurality of radially outwardly extending arms fixed to the core, and threshing and separating members attached to the outer ends of the arms and also generally extending fore-and-aft of the machine. Thus the rotor has an open structure and this type of rotor has several disadvantages, one being that straw material can hook around the threshing and separating members, whereby an obstruction is built up to the fluent axial flow of the crop through the threshing and separating means. Such an obstruction often results in jamming of the rotor, especially when the combine is handling rice or wet straw material, for example. Another problem is that the rotor is rotating in a generally cylindrical rotor casing comprising on its inner surface spiral transport fins. During normal operation the crop moves, under influence of the centrifugal forces, against the inner surface of the casing so that axial movement is induced to the crop by the transport fins. However, it often happens that instead of moving against the inner surface of the casing, the straw becomes roped and tightened around the rotor structure whereupon axial movement is no longer induced to the crop mat because the mat is prevented from contacting the transport fins. This finally results in jamming of the rotor. The foregoing disadvantage is particularly critical when the combine is handling long and/or tough straw such as with rye and rice, for example.

All the foregoing disadvantages often result in an uneven transport of the crop, noisy operation, high peak loads in the drive means, high power requirements, low capacities, etc. The noisy operation is often characterised by a hammering inside the machine resulting from the straw masses accumulated in the spaces between the rotor and the cylinder and from these masses attempting to pass from time to time through the space between the threshing and separating members and the inner surface of the rotor housing. Another disadvantage is encountered with the prior arrangements when harvesting corn. As is well know, the corn ears are fed to the threshing and separating mechanism without the straw. Due to the physical nature of the corn ears and due to the structure of the prior art rotors, the corn ears move in a very random manner through the rotor casing. This is especially true when the so-called open structure rotor is used.

Another disadvantage which is often encountered in conventional machines is the problem of the grain crackage. In some situations, for example when the harvested grain is to be conserved for next season's crop, the percentage of cracked grain should be as low as possible as cracked grain is not germinative. The percentage of cracked grain is also critical, for example, when the grain (such as rice) is sold to the consumer in which case it has to be sorted so as to exclude cracked grains. The foregoing explains why the percentage of cracked grain is often critical in determining the price the farmer can obtain for his crop.

The foregoing is only a brief discussion of the major disadvantages of axial flow machines and other disadvantages will be known to those skilled in the art. The main object of the present invention is to overcome or reduce one or more of the disadvantages of known axial flow harvesting machines.

SUMMARY OF THE INVENTION

According to the present invention there is provided an axial flow type harvesting machine having a threshing and separating mechanism comprising a concave co-operable with a rotor, the rotor having a generally cylindrical body portion from the surface of which extends at least one threshing member for operating on the crop material to be harvested and a casing in which the rotor is mounted. The term "generally cylindrical" as applied to the rotor body portion is intended to cover rotor shapes approaching cylindrical, such as polygonal.

Each threshing member preferably comprises a rasp bar mounted on a support whereby the rasp bar is spaced from the periphery of the rotor body portion. This arrangement provides one or more pockets, depending on the number of threshing members, between the rotor body portion and the casing.

Conveniently, the body portion of the rotor is provided with apertures which enable access to be gained to the interior of the body portion for maintenance and repair, the apertures having removable covers. The threshing members may extend generally parallel to the axis of the rotor.

Feed means may be provided for feeding crop material to the threshing and separating mechanism and the feed means may be detachably mounted on the rotor whereby the feeder elements are readily replaced if damaged and also readily changed to alternative elements that may be required in connection with the harvesting of a particular crop or condition of crop. The feed means may be in the form of an auger, the feeder elements in this case being constituted by the auger flight. Preferably an auger flight is provided for each threshing member on the rotor. An anti-wrap device, which may be stationary or rotatable, may be provided at the forward end of the feed means.

The threshing and separating mechanism may comprise a threshing section and a separating section and the separating section preferably also comprises a rotor in the form of a body portion on which is mounted at least one separating member extending radially of the body portion and operable to separate grain from the threshed crop material and further operable in co-operation with transport members on the inner surface of the rotor casing to transport crop material generally axially of that section. Conveniently a common rotor is provided for the threshing and separating sections and the body portion in the separating section may by cylindrical so as to be similar with that of the threshing section.

The threshing and/or separating members may extend spirally around the respective rotor body portions whereby they serve not only to thresh or separate grain but also to transport crop material generally axially of the associate section since in this connection they function in the manner of an auger. The crop material is preferably discharged from the separating section generally tangentially of the rotor in that section and to this end, the separating members may extend parallel to the rotor axis at the rearward ends thereof. To assist in the axial transport of the crop material through the threshing and separating mechanism, the rotor casings may be provided on the inner surface thereof with fins but these are made to extend a relatively short distance into the casing to minimise the problem referred to above of the fins acting as knives and cutting the crop material into short pieces.

The rotor of the threshing and separating mechanism may comprise two stub shafts, one at each end, which support the generally cylindrical body portion. The body portion may be substantially self-supporting although reinforcing members may be provided.

The present invention provides a smoother flow of crop material through the threshing and separating mechanism, which may be of the single, twin or plural rotor type, whereby the overall power requirement of the machine is reduced. Furthermore, the smooth flow of crop material through the threshing and separating mechanism reduces the likelihood of jamming occurring. With this reduction or elimination of certain disadvantages of axial flow type harvesting machines, a greater efficiency thereof, in terms of tons harvested per horsepower, compared with proposed axial flow machines is realised. Also a smaller machine can be produced for a given capacity in relation to a conventional machine of the same capacity. The smooth flow of crop material also means that a relatively thin and even mat thereof is operated on by the threshing and separating mechanism whereby the effectiveness of the latter is increased with the result that grain loss is decreased without any sacrifice in the power requirement. Also with the present invention, less grain kernels are cracked whereby the quality of the harvested grain is increased considerably. Furthermore, the rotors and other components are of relatively simple construction so reducing manufacturing and servicing costs. Also the rotor components are readily changed, should a particular crop or crop condition so dictate.

BRIEF DESCRIPTION OF THE DRAWINGS

An axial flow type combine having twin rotors and embodying the present invention will now be described in greater detail, by way of example, with reference to the accompanying drawings, in which:

FIG. 3 is a sectional view of a component of FIG. 2, FIG. 3a is a fragmentary perspective view of the component shown in FIG. 3.

FIG. 4 is a part perspective view of FIG. 1 taken generally from the front of the machine but with certain components removed and others broken away, FIG. 5 is an enlarged sectional view on line 5—5 of FIG. 3, FIG. 6 is a view similar to that of FIG. 5 but showing a modification, FIG. 7 is an enlarged cross-sectional view on line 7—7 of FIG. 2, FIG. 8 is an enlarged cross-sectional view on line 8—8 of FIG. 2, FIG. 9 is a side elevational view of an alternative form of the component of FIG. 3.

DETAILED DESCRIPTION OF THE PREFERRED EMBODIMENT

In the following description, right-hand and left-hand references are determined by standing to the rear of the combine and facing in the direction of operation. Forward and rearward references are related to the direction of operation.

Figure 1:
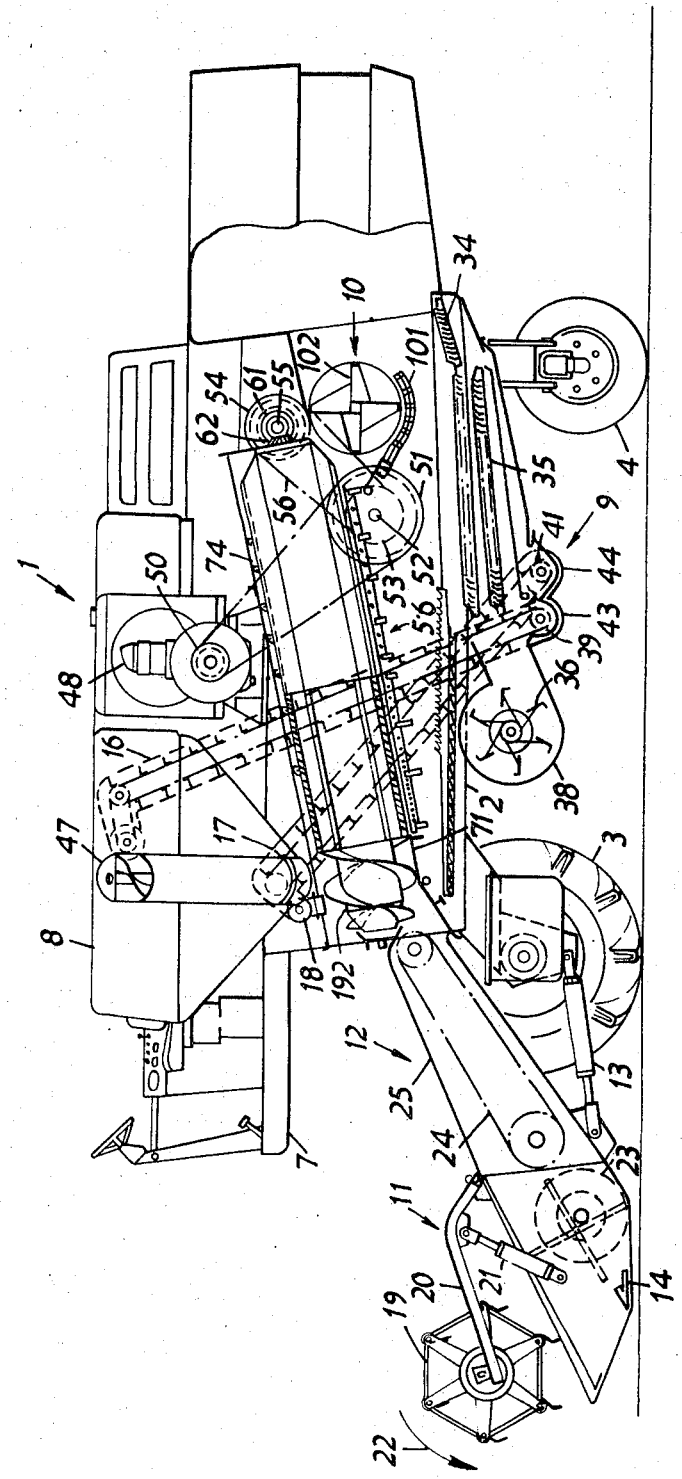
FIG. 1 is a side elevation, partly in section, of the combine embodying the present invention.

Referring to FIG. 1, the combine is generally indicated at 1 and comprises a main frame 2 supported on front drive wheels 3 and smaller rear steerable wheels 4. Supported on the main frame 2 are a threshing and separating mechanism in the form of right- and left-hand threshing and separating units 5, 6, respectively, extending generally longitudinally of the combine, an operator's platform 7, a grain tank 8, grain cleaning means 9, and a rotary straw discharge means 10. A conventional header 11 and feed conveyor 12 extend forwardly of the machine and the header is pivotally secured to the frame 2 for general vertical movement which is controlled by extensible hydraulic cylinders 13.

As the combine 1 is propelled forwardly over a field, the crop material which is to be harvested is severed from the stubble by a sickle bar cutter 14 on the header 11 and is conveyed by the feed conveyor 12 to the threshing and separating units 5, 6. The material received within the threshing and separating units 5, 6 will be threshed and separated, that is to say the crop material (which may be wheat, corn, rice, soy beans, rye, grass seed, barley, oats or other similar crop materials) is rubbed and beaten whereby the grain, seed etc. is loosed and separated from the straw, stalks, cobs or other discardable part of the crop material. While the terms grain and straw are used principally through this application for convenience, it should be understood that the terms are not intended to be limiting. The term grain as used herein thus refers to that part of the crop material that may be threshed and separated from the discardable part of the crop material which will be referred to as straw.

The straw is discharged from the rear of the threshing and separating units 5, 6 onto a feeder plate 15 of the rotary discharge means 10 which finally discharge the straw to the ground. The grain and other material which has been separated from the straw falls onto the grain cleaning means 9 which includes means to separate clean grain and means to separate unthreshed material (known in the art as tailings) from the remainder of the material received in the cleaning means. The cleaned grain is then elevated into the grain tank 8 by an elevator 16, and the tailings are raised by an elevator 17 and fed by an auger 18 to unthreshed crop material delivered by the feed conveyor 12 to the threshing and separating mechanism.

The header 11 is of the grain type but other forms of headers may be employed, as for example a corn header, depending on the crop to be harvested. The header 11 is provided with a reel 19 carried on an adjustable support 20 which is positioned by hydraulic cylinders 21. In operation, the reel 19 rotates in the direction indicated by the arrow 22, to force crop material into the header. The cut crop material is consolidated laterally of the machine by two opposed augers 23 which feed the crop material centrally to the feed conveyor 12 in the form of a chain conveyor 24 mounted within a housing 25. The conveyor 24 in turn conveys the crop material to the threshing and separating units 5, 6.

Figure 2:
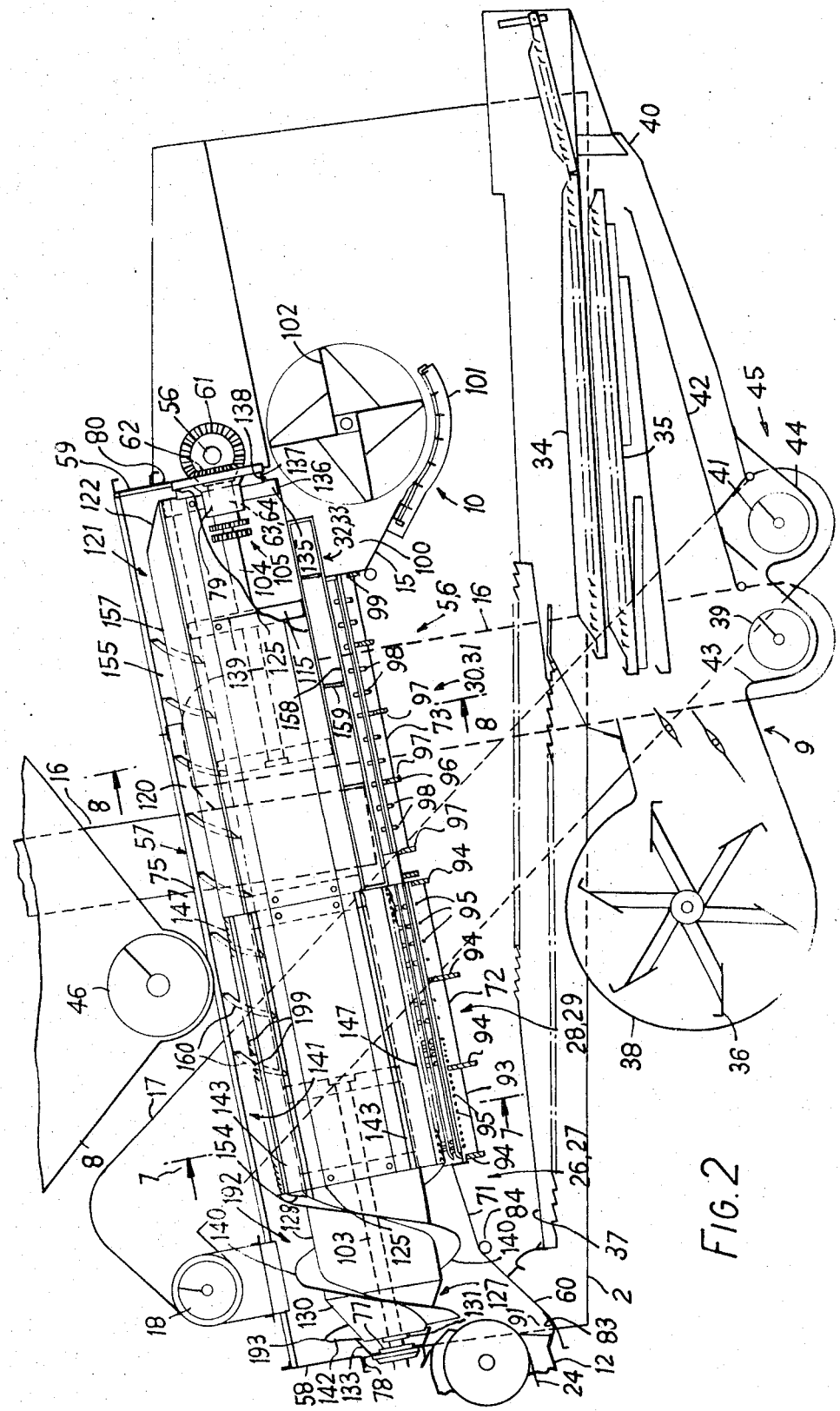
FIG. 2 is an enlarged sectional view of a detail of FIG. 1 with certain components removed.

As can be seen from FIG. 2, the threshing and separating units 5, 6 have feed sections 26, 27 threshing sections 28, 29, separating sections 30, 31 and discharge sections 32, 33, respectively. Each unit 5, 6 also comprises a rotor 74 which will be referred to in detail hereafter. In the threshing sections 28, 29, the crop material is threshed and a large proportion of the grain is separated from the straw and falls to the grain cleaning means 9. A certain proportion of the grain, however, will be conveyed rearwardly into the separating sections 30, 31 with the straw and additional separation of this entrained grain takes place within these sections.

The grain cleaning means 9 (FIG. 2) is generally conventional and includes an oscillatory chaffer sieve 34, an oscillatory grain sieve 35 and a fan 36. The separated grain is discharged from the threshing sections 28, 29 and separating sections 30, 31 either onto an oscillatory grain pan 37 or the forward end of the sieve 34. The majority of the grain falls onto the grain pan 37 which subsequently discharges the grain onto the chaffer sieve 34. The chaffer sieve 34 is provided with means whereby the apertures in the sieve can be adjusted so that grain received on the sieve may fall through the sieve while the trash is shaken rearwardly for discharge, the lighter chaff also being blown rearwardly by the fan 36 mounted in a housing 38 (FIG. 2). The grain sieve 35 is provided with apertures which permit only the grain to pass therethrough down to a grain auger 39; anything larger than the grain, such as the tailings, being discharged to the rear of the sieve 35 onto an oscillator chute or guide 40 which then directs any tailings into a tailings auger 41. The cleaned grain drops onto a chute 42 and is then directed to the grain auger 39. The chaffer sieve 34, grain sieve 35 and chute 42 are each oscillated in a fore-and-aft direction of the combine. The grain auger 39 and tailings auger 41 are disposed in troughs 43 and 44, respectively, formed in a casing 45 which is an extension of the housing 38. The grain is conveyed from the trough 43 to the grain tank 8 by the elevator 16 and the tailings conveyed to the feed sections 26 and 27 of the threshing and separating units 5, 6 by the auger 18 via the tailings elevator 17. The grain may be discharged from the grain tank 8 by a grain unloading auger 46 which forces the grain to a discharge spout 47.

The various components of the combine 1 are driven from a conventional internal combustion engine 48. Only the drive means to the threshing and separating means 5, 6 are illustrated in the drawings (FIGS. 1 and 2) the other drive means being conventional.

It is desirable to operate the threshing and separating units 5, 6 at different speeds which are not directly proportional to the engine speed. Therefore, it is necessary to provide a variable speed drive between the engine 48 and the threshing and separating units 5, 6, this being shown as a variable sheave or pulley drive. The engine 48 has an output drive sheave 50 which drives a sheave 51 mounted on a shaft 52 (FIG. 1). A first variable sheave 53 is mounted concentrically with the driven sheave 51 on the shaft 52 and is driven by the sheave 51. A second variable sheave 54 is mounted on a shaft 55 and is driven by a belt 56 which extends over the first variable sheave 53. The shaft 55 drives two gearboxes, comprising conical gears 61, 62 which in turn drive output shafts 63, 64 which may be coupled to the respective rotors 74 of the units 5, 6. The arrangement is such that the rotors 74 rotate in opposite directions and are moving downwardly at their adjacent sides.

The threshing and separating units 5, 6 comprise fore-and-aft extending generally cylindrical rotors 74 housed in casings 57 defined in part by removable upper walls 75 extending the entire length of the units and being secured by bolting or other suitable means to the main frame 2 of the combine. Front cover plates 58 are provided for covering the gaps between the forward ends of the upper walls 75 and a forward transverse beam 78. The rear ends of the casings 57 are closed by means of transversely extending plates 59 and a beam 80. The rotors 74 may be polygonal in shape instead of cylindrical, the main requirement being that the space between the periphery of each rotor and the respective casing is kept to a minimum consistent with movement of the crop material therethrough, and that the space is substantially constant around the periphery.

The forward feed sections 26, 27 are further defined by an irregularly-shaped feed plate 71 (FIG. 4) having part-cylindrical rear edges 82 extending generally concentrically with the respective rotors 74 and further comprising a forward downwardly-extending curved extension plate 60 for co-operating with a lower sealing strip 83 of the feed conveyor 12. Between the rear edges 82 and a generally recti-linear front edge 84, the feed plate 71 comprises generally triangular-shaped slightly upwardly inclined and rearwardly facing bottom transition portions 85 which are connected at their outer side edges 86 to triangular-shaped arcuate side transition portions 87 having rear edges forming part of the aforementioned rear edges 82 of the feed plate 71, and their other edges connected to the side walls of the combine frame 2. The bottom transition portions 85 are connected at their inner side edges 88 to inner triangular-shaped arcuate transition portions 89 which have rear edges forming part of the rear edges 82 of the feed plate 71 and having their other edges interconnected with each other at 90.

The feed conveyor 12 is pivotally coupled to the combine frame 2 and has its discharge end at an infeed opening 91 defined by the transverse beam 78 and the curved extension plate 60 of the feed plate 71.

Threshing concaves 72, and central and outer concave extensions 92 (FIG. 7) complete the generally cylindrical casings 57 at the location of the threshing sections 28, 29. The concaves 72 are formed by a number of longitudinally-extending bars 93 secured to a number of transverse arcuate supporting beams 94 which are generally concentric to the rotors 74. Wires 95 extend in transverse direction through the concave bars 93. The concaves 72 are made adjustable in height in order to enable the selection of the optimum concave setting for a given crop or crop condition.

Separator grates 73 comprising a number of longitudinally-extending bars 96 fixed to arcuate supporting bars 97 and a number of transversely-extending wires 98, complete the generally cylindrical casing 57 at the location of the separator sections 30, 31. The apertures between the bars 96 and the wires 98 of the separator grates 73 are considerably larger than the apertures in the threshing concaves 72 so as to suit better the specific function of separating the threshed grain. The separator grates 73 are normally located at a lower position with respect to the rotor than the threshing concaves 72 because only a separating action is required as opposed to a rubbing, threshing action.

Rear transverse arcuate supporting bars 99 (FIG. 2) define the forward edges of a discharge opening 100. The feeder plate 15 of the discharge means 10 is fixed to the bars 99 and is inclined downwardly and rearwardly in order to feed the straw discharged from the rotors 74 to the discharge means 10. The discharge means 10 further comprises a transversely-extending grate 101, which is positioned generally above the chaffer sieve 34, and a beater 102 rotatably mounted above the grate 101 to eject the straw fed to the discharge means 10 to the ground at the rear end of the combine and to accomplish, in conjunction with the grate 101, a final separation of grain from the straw.

The rotors 74 are rotatably and concentrically mounted within the respective casings 57 and the drive means are arranged to drive both rotors 74 in opposite directions 191 and downwardly at their adjacent sides. Each rotor 74 comprises a forward stub shaft 103 and a rear stub shaft 104, the forward one being journalled in a bearing 77 provided on the front transverse beam 78, the rear one being received in the associated output shaft 63, 64, which in turn is journalled in a bearing 79 on the rear transverse beam 80. The rear stub shafts 104 are normally firmly coupled to respective output shafts 63, 64, by coupling means 105 basically consisting of a chain coupler and enabling quick assembly and disassembly of the threshing and separating units from the machine. Reinforcing ribs 106 (FIG. 3) are welded to the rear end of the rear stub shafts 104.

Each front stub shaft 103 supports forward flange means including an annular flange 107 which is welded thereto having apertures 108 at its outer edge for receiving fastening means 109 and which is provided with a central collar 110, and a forward threshing section supporting flange 111 provided with a number of apertures adapted for receiving the fastening means 109 which is secured to the flange 107 provided on the forward stub shaft 103. Rear flange means including another flange 112 provided with a number of apertures 113 arranged at its outer edge and a central collar 114 is welded to each rear stub shaft 104, the flange 112 supporting a rear separating section supporting flange 115 via fastening means 116. The rear flange 115 is provided with a central bore which accurately fits the collar 114. Both supporting flanges 111, 115 are made of deepdrawn material and have outer overturned edges 117. Arcuate plates 118, extending over the total length of the threshing, separating and discharge sections of the rotors 74, respectively 119, 120 and 121, are bolted, preferably by means of square neck carriage bolts, to the overturned edges 117 of the forward and rearward supporting flanges 111, 115, to form a generally cylindrical body portion of the rotor.

The forward and rear stub shafts 103, 104, the flanges 111, 115, and the plates 118 form a base unit 134 (FIG. 3) of each rotor 74 having elongated sevice openings 123 (FIGS. 7 and 8) extending between the plates 118. The base unit 134 further comprises a number of spaced-apart reinforcing flanges 122 disposed between the flanges 111, 115 and also having overturned outer edges 117 to enable the attachment thereof to the plates 118. Access to the attachment means can be gained through the service openings 123.

Each of the outer ones of the reinforcing flanges 122 is provided with a central sleeve 124 having an accurately finished inner bore for co-operating with an equally accurately finished end of the corresponding stub shaft 103, 104 so as to form therewith a tight or friction fit and for giving the base unit 134 more solidity and strength.

At the rear end, the base unit 134 further supports a flange 135 (FIG. 2) having an outer forwardly facing overturned edge 136 for attachment to the plates 118, and an inner rearwardly facing overturned edge 137 which generally surrounds a forwardly facing overturned edge 138 provided on the rear transverse beam 80 for sealing purposes.

The front and rear supporting flanges 111, 115, as well as the intermediate reinforcing flanges 122, are provided at the location of the service openings 123 at the inner side of the overturned edges 117 with weld nuts. Elongated and arcuate service panels 125 are arranged to overlap the side edges of the plates 118 and to cover the service openings 123. The service panels 125 are held in position by bolts which co-operate with the aforementioned weld nuts on the inner side of thee overturned edges 117 of the flanges.

The aforementioned service panels 125 only extend to the flange 115 and the portions of the service openings 123 at the location of the coupling means 105 are covered by separate smaller service panels 139 having a forward edge which fits underneath the rear edge of the larger service panels 125 and which are fastened in position by bolts which co-operate with weld nuts provided on the inner side of the overturned edge 136. These separate service panels 139 enable easy access to be gained to the coupling means 105 without having to remove the larger service panels 125.

At the forward end, each rotor 74 comprises a removable feed section 192 (FIG. 3) having an auger base 127 mounted on the forward stub shaft 103. The auger base comprises a cylindrical body 128 attached at its rear end to a flange 129 and at its forward end to a conical extension 130. The flange 129 supports a number of weld bolts 132 which fit in the aperture 108 provided on the flange 107 provided on the forward stub shaft 103 and enable both the forward auger base 128 and the forward threshing section supporting flange 111 to be bolted to the flange 107. The conical extension 130 is provided at its forward end with a sleeve 131 having an accurately finished inner bore for co-operating with the accurately finished forward end of the forward stub shaft 103. As will readily be understood from the foregoing, the auger base 127 can easily be mounted on and detached from the base unit 134.

The front transverse beam 78 supports at the location of each bearing 77 a rearwardly facing conical anti-wrap shield 133 of which the rear circular edge extends generally past and around the forward edge of the auger base 127. This anti-wrap shield 133 may be fixed to the beam 78 or may be made freely rotatable.

The auger base 127 supports a number of auger flights 140, the number of flights being the same as the number of threshing means 141 in the threshing mechanism and the outer edges of the auger flights 140 being situated at generally the same radial distance away from the axis of the rotor as the generating line of the threshing means. Each auger flight 140 has a front edge 142 extending generally radially away from the forward conical extension of the auger base 127 just behind the rear edge of the anti-wrap shield 133 and has a rounded part as can be seen in FIG. 2.

The threshing section 119 of each rotor 74 preferably comprises two diametrically opposed rasp bar supporting members 143 disposed between the service openings 123 and having, relative to the direction of rotation of the rotor, a rearwardly and upwardly inclined front wall 144, a top wall 145 slightly inclined upwardly, and a rear wall 146 sharply inclined downwardly from the top wall. The support members are attached to the base unit 134 preferably by the same type of square neck carriage bolts 153 as used for fixing the plates 118 to the supporting and reinforcing flanges 111, 115 and 122.

Rasp bars 147 having rasps 148 alternating with recesses 151 are bolted to the top wall 145 of the support members 143 and extend generally parallel to the longitudinal axis of the rotor 74 in spaced relationship to the body portion of the rotor. The rasps 148 and recesses 151 are inclined or skewed with respect to the longitudinal axis of the rotor in such a manner that they impart a rearwardly directed axial movement to the crop during operation. Bolts 149 for securing the rasp bars 147 to the rasp bar supporting members 143 extend through apertures in the top wall 145 and co-operate with weld nuts 150. The rasp bar supporting members 143 are preferably made of deepdrawn sheet metal and have outwardly turned front and rear flanges 152 in which holes are provided for receiving the square neck carriage bolts 153. The front wall 144 subtends a smaller angle with respect to the appropriate tangent to the rotor body portion than does the rear wall 146 for reasons to be explained hereinafter. The rasp bars 147 and the rasp bar supporting members 143 can be preassembled, which makes assembly of the complete rotor 74 easier to accomplish.

The dead space or angle formed between each rasp bar supporting member 143 and the corresponding auger flight 140 is filled by a profiled piece 154 (FIG. 2) welded to the side of the auger flight.

The separating section 120 of each rotor 74 supports separating elements 155 comprising an arcuate base plate 156 bolted to the plates 118, an elongated radially outwardly extending beater blade 157 welded to the plate 156 and having a rearwardly overturned outer edge 158. Reinforcing fillets 159 are welded to the base plate 156, the rear wall of the beater blade 157 and the overturned edge 158 at regularly spaced intervals. The separating elements 155 extend axially from the threshing section 119 to the rear edge of the discharge section 121 and comprise a bevelled rear edge 122 for preventing interference with the discharge beater 102.

The upper walls 75 support at their inner surfaces over the length of the threshing and separating sections 119, 120 a number of spiral-shaped deflecting members or fins 160 (FIG. 2) which are arranged in such a manner that in operation they too impart an axial flow to the crop material.

OPERATION

In operation, the feed conveyor 12 feeds the crop material in a generally flat mat through the gap 91 formed underneath the transverse beam 78 and the anti-wrap shields 133 and above the feed plate 71 whereby the mat is brought within the reach of the forward ends of the auger flights 140 of the two rotors 74 which are in parallel side-by-side arrangement and slightly inclined upwardly towards the rear of the combine. As already mentioned, the rotors 74, and hence the augers 140, are driven in opposite direction 191 so that when the augers operate on the mat they tear it apart into two separate halves. The anti-wrap shields 133 prevent straw material from wrapping, and becoming tightened, around the stub shafts 103. Under influence of the auger flights 140, the crop material is conveyed rearwardly in a generally spiral path around the rotor feed sections 192. From the foregoing it will be seen that the crop material is generally, although not exclusively, moving between the lower and side parts 87 of the feed plate 71 and the adjacent auger flights 140. This is particularly true when crops comprising a considerable amount of straw material are harvested (e.g., wheat, rye, etc.) in which case the space between the auger flights 140 will only accommodate a minor percentage of the material to be conveyed as the major percentage of material is pressed and moving between the feed plate 71 and the outer edges of the auger flights 140. However, when harvesting corn, for example, only the ears are fed to the threshing and separating means 141, 155 and these generally fill the spaces between the auger flights 140 due to their physical nature. Under no condition can the harvested crop move closer to the axes of the rotors than the radial dimensions of the feeder base 127. This means that the mat of crop material is, as soon as it reaches the feeder means 140 of the rotor, deflected into a spiral path, the radius of which generally corresponds to the radius of the rasp bars 147.

The auger flights 140 have their forward edges 142 extending radially outwardly past the anti-wrap shields 133 and the generating line of these edges 142 is in close relationship to the elevator means 24 of the feed conveyor 12 so that the flights have an aggressive grasp on the straw mat in order continuously to clear away the crop material from the elevator means 24. Thus this prevents any back feeding of the crop material by the elevator means 24. The forward portions of the auger flights 140 are rounded at 193 whereby is reduced the straw-cutting action of the auger flights 140 so that the amount of short straw which is discharged with the threshed and separated grain to the grain cleaning means 9 remains within acceptable limits.

Due to the provision of the conical forward extension 130 of the feeder base 127, it is possible to provide relatively small anti-wrap shields 133. This has proven to be extremely advantageous as the small anti-wrap shields 133 no longer form an obstruction for the fluent flow of the crop material from the feed conveyor 12 to the units 5, 6, and yet fulfil their function. Also, if for some reason the augers need to be replaced, this can be accomplished easily and quickly.

As the feeder base 127 and the base unit 134 have the same outer diameter, as the circle described by the outer edges of the auger flights 140 and the rasp bars 147 have the same outer diameter, and as the rasp bars 147 and the rasp bar supporting members 143 lie close against the adjacent portions of the auger flights 140 and the auger flight extension or profiled pieces 154, a smooth transmission of the straw mat from the rotor feeder section 192 towards the threshing section 119 is ensured. Also, as all the components of the rotor structure are so shaped that no apertures of significant size exist therebetween, the likelihood of straw hooking around one or other component is small. For these reasons, jamming of the rotors is virtually eliminated. In the threshing and separating section 119, 120 of each rotor 74, the crop moves in a spiral path around the rotor towards the discharge end. The circular component of this movement of the crop is induced by the rotational movement of the rotor 74, whilst the axial component is induced by the interaction of the fins 160 on the crop and by the particular arrangement of the rasps 148 and recesses 151 on the threshing means 141 as already mentioned.

During operation, the pockets formed between the rotor body portion, the rasp bar supporting members 143 and the rasp bars 147 on the one hand and the casing 57 on the other hand, may hold the crop material. The material held in such pockets will, on rotation of the rotors 74 and under influence of the action of the upwardly inclined front walls 144 of the support members 143, be urged towards the peripheries of the rotors 74. The threshing action is basically obtained from the rubbing of the rasp bars 147 on the crop and the rubbing of the crop on the inner side of the casings 57, especially on the threshing concaves 72, on the one hand, and from the beating action of the rasp bars 147 on the crop on the other hand. It will be appreciated that the differences in circumferential speeds between the casings 57 and more especially the concaves 72, and the crop, and between the crop and the rotors 74 are responsible for the rubbing action. It will also be appreciated that although the threshing resulting from the beating action is still an important factor, in axial flow combines the threshing action is obtained by the described rubbing action more so than in conventional machines in which the threshing action is mainly accomplished by the beating of the rasp bars on the crop. This manner of threshing in axial flow machines is especially advantageous in view of the reduced percentage of cracked grains produced. The major portion of the threshed grain is also separated through the concaves 72 under the influence of the same beating and rubbing action. This separation is considerably improved by the provision of the pockets referred to above which ease the pressure on the straw mat, and thereby allow grain to fall therefrom, when a rasp bar 147 has passed thereover. The grains which are separated in the threshing section 119 fall onto the grain pan 37 for further treatment as already described.

After being treated in the threshing sections 28, 29, the threshed straw mats move on in their spiral paths towards the separating sections 30, 31 where the transport fins 160 further ensure the spiral movement of the crops around the rotors 74. As the separator concaves 73 are positioned considerably lower than the threshing concaves 72, i.e. further spaced from the rotors, the straw mats are looser when moving over these separator concaves 73 so that the beating action of the beaters 157 on the straw mats is as effective as possible for beating the remainder of the threshed grain out of the straw mats. The grains separated in the separating sections 120 are supplied to the grain pan 37 or directly to the forward end of the chaffer sieve 34 for further treatment, again as described above.

The straw which is supplied to the discharge section 121 of the rotors 74 is no longer subjected to the axial-flow-inducing forces of the fins 160 and is therefore discharged generally tangentially of the rotors 74 onto the feed plate 15 for deflection towards the discharge beater 102.

At the location of each separating section 120, the straw mat can again ease in the pockets formed between the rotor body portion, separating elements 155 and the casing 57 as in the threshing sections. On the other hand the cylindrical rotor body portions in the threshing and separating sections 119, 120 keep the depth of the pockets such that crop material cannot permanently lodge therein so that a fluent flow of crop material through sections is achieved which in itself reduces the likelihood of rotor jamming. The cylindrical rotor body portion design is advantageous over the prior art oval or elliptical rotors in that for the same diameter of pitch circle of the rasp bars, the circumferential length of the rotor structure itself is longer. This again reduces the possibility of straw becoming wrapped around the rotors and hence the likelihood of the rotors becoming jammed whereby idle machine time is also reduced.

The rotor design virtually excludes the possiblity of straw becoming hooked around one or other component so that jamming is avoided. This is due to the fact that the rotor structure is generally cylindrical and forms a completely closed unit without having any apertures of a considerable size, and that all components have a smooth transition between each other. All protruding components around which straw could hook have thus been eliminated which results in a smooth flow of the crop through the unit 5, 6, a smooth operation of the machine, and a relatively constant and low-level power consumption.

It will also be appreciated that the smooth flow of crop and generally smooth operation is advantageous for good threshing, separation and cleaning. Indeed, all the above advantages result in a constant or even loading of the threshing, separating and cleaning means which results in optimum operation of these different components. As a further result, the capacity of the combine can be increased to a relatively constant and high level while the percentage of grain losses remains below the maximum acceptable level. Still another advantage of the present invention resides in the fact that the major proportion of the total weight of the rotor is located as close as possible to the outer circumference. This is advantageous from the kinetic energy standpoint as the rotor is able to minimise the influence of peak loads and to maintain its smooth operation. Furthermore, due to the generally cylindrical structure of the rotors, the fanning effect of the rotors, which otherwise could adversely affect the proper cleaning action of the grain cleaning means 9, is kept to a very low level. The rasp bar support members 143 which are needed to space the rasp bars from the rotor body portions in order to form the above-mentioned pockets, only produce a low level fan effect which is normally insignificant.

The axial flow combine described is particularly advantageous in the harvesting of corn which thus makes it a universal machine. The threshing concave setting is such that the cobs can just pass inbetween the concaves 72 and the rasp bars 147, whilst the ears cannot pass therethrough. The ears can, however, be held in the aforementioned pockets which means that they can progressively be transported in a positive manner whilst being continuously held in contact with the casings 57, whereby the rubbing effect looses the grain kernels from the cobs.

MODIFICATIONS

Figure 10:
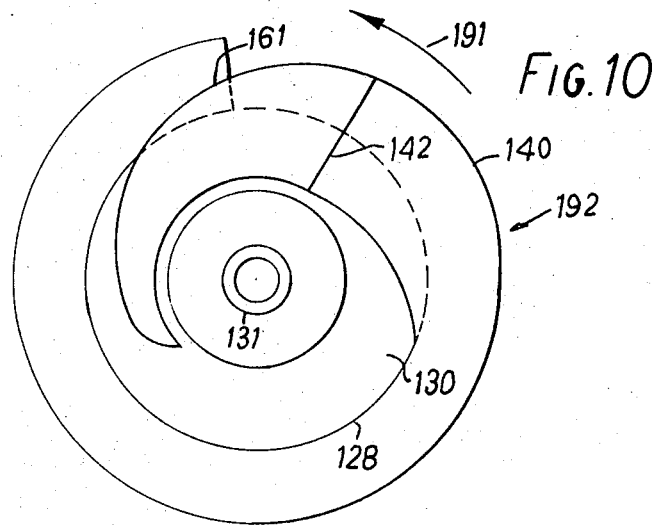
FIG. 10 is a view seen in the direction of arrow X in FIG. 9 but of an alternative arrangement.

In an alternative embodiment (FIG. 10), each feed auger is provided with a forward extension 161 arranged generally perpendicular to the rotor axis and having decreasing radial dimensions such that at a location generally in front of the forward edge 142 of the auger flight 140 seen in the direction of rotation, it terminates in a point generally on the surface of the forward conical extension 130 of the feeder base section 127. This arrangement still further reduces the likelihood of straw hooking around the forward radially-extending edge 142 of each auger flight. However, the auger flights still remain in close relationship with the generating line of the elevator conveyor chain 24 so as to clear away continuously the crop material from the elevator as described above.

Figure 11:
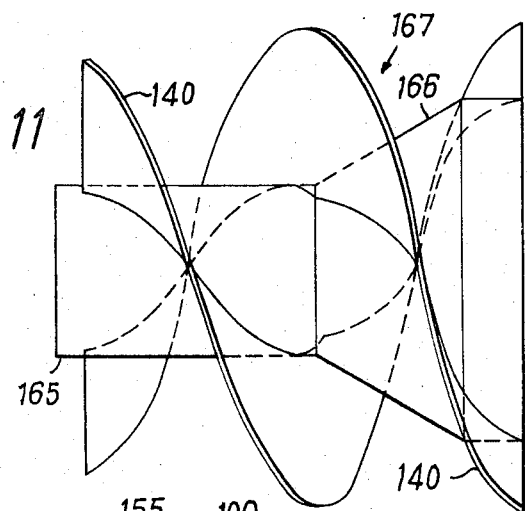
FIG. 11 is a fragmentary side elevational view of a modified arrangement of the forward end of the component shown in FIG. 9.

In another alternative arrangement (FIG. 11), the base unit 167 of the feeder section has a generally cylindrical forward section 165 with a diameter considerably smaller than the diameter of the associated threshing rotor body portion. The feeder base section 167 is provided with a rearwardly facing conical extension 166 having its rear edge of a diameter the same as that of the adjacent threshing rotor body portion. The auger flights 140 supported on the feeder base section 167 have a pitch circle which generally corresponds with the pitch circle of the threshing means 141. This arrangement is particularly advantageous when harvesting corn, especially when harvesting at high capacity rates, because the larger spaces between the auger flights can accommodate a larger volume of crop.

In yet another modification of the combine described in relation to FIGS. 1 to 8, each rasp bar is bolted to a rasp bar supporting member 170 (FIG. 6) extending parallel to the longitudinal axis of the rotor and comprising an arcuate bottom wall 171 bolted to the plates 118, a rearwardly and upwardly inclined front wall 172, a slightly upwardly inclined top wall 173 for supporting the rasp bar, an open rear end, and reinforcing fillets 174 spaced apart from each other at regular intervals and welded to the three walls. The bolts 149 for fixing the rasp bars 147 to the supporting members 170 and the bolts 153 for securing the latter to the rotor base unit 134 are all situated rearwardly of the front wall 172. As will be understood from the foregoing, it is possible to interchange the rasp bars 147 without having to remove the rasp bar supporting members 170 from the base unit 134. In another arrangement, additional rasp bars 147 and rasp bar supporting members 143 or 170 may be provided inbetween those already described. Preferably, these additional rasp bars and rasp bar supporting members are identical to those described above and are secured to the aforementioned service panels 125 and extend forwardly to the feeder section up to the rearwardly facing wall of the nearest auger flight 140.

In yet another and preferred arrangement shown in FIG. 9, rasp bars 180 and rasp bar supporting members 181 are generally spiral shaped with the pitch thereof smaller than the pitch of the auger flights 140. The spiral rasp bars 180 and supporting members 181 are arranged in such a manner that, in operation, they propel the crop material in an axial direction towards the rear end of the rotors 74. Preferably the separating blades 183 will also be spiral and have the same angle of inclination as that of the threshing means 141 which conveniently lies in the range 5° to 15°. At the location of the discharge section 121, the separating blades 183 have an extension 184 extending generally parallel to the axis of rotation of the rotor in order to act as discharge blades for discharging the straw material generally tangentially of the rotor. The transport fins 160 as described in the main embodiment may be dispensed with in this arrangement or alternatively may be provided, although they need not extend so far into the rotor casings as the rasp bar and separating blades themselves perform the main crop transport function.

It has been found that these arrangements, both the one without any fins 160 and the one with shorter fins 160, require less power for treating the crops. In addition to requiring a larger motive power, the larger fins 160 are found to act as knives and to cut the straw into short pieces with the result that the grain cleaning means 9 tends to be fouled by these pieces and the subsequent baling operation is made difficult as already mentioned. The cutting of the straw appears to arise from the fact that the crop material tends to move over the inner edges of the fins 160. The provision of smaller or shorter fins 160 in the alternative arrangement has proved to result in a still better operation without producing too much cut straw pieces.

Apart from the spiral form of the rasp bars 180, the rasp bar supporting members 181 and the separator elements 183, all other components are unchanged in the arrangement of FIG. 9. It is found that this arrangement requires a reduced motive power which is readily understood when one considers that projecting something directly in the intended direction of movement needs less force than projecting it against a fixed member which then directs it in the intended direction of movement. It is also found that a very even flow of the crop through the machine is obtained which results in the ability of the machine to handle higher capacities without increasing the grain loss level above the acceptable limit and without creating a dangerous situation as regards rotor jamming. The drastic reduction of the likelihood of rotor jamming may also be due to the fact that with the spiral rasp bars 180 there is only point co-operation with the concaves as seen in the axial direction of the rotor, whereas there is line co-operation with rasp bars extending parallel to the rotor axis whereby the tendency of the crop to get roped resulting in hammering is reduced considerably. Spiral rasp bars have also been found particularly advantageous in the harvesting of corn.

Figure 12:
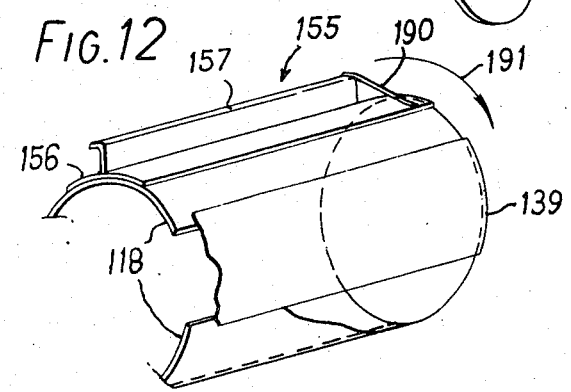
FIG. 12 is a fragmentary perspective view of a modified arrangement of the rear end of the component shown in FIG. 9.

It is found that the forward ends of the rasp bars 147 are subjected to greater wear compared with the rear ends and, therefore, the rasp bars are conveniently made in two sections, as indicated at 199 in FIGS. 3 and 9, in order that they may be replaced independently of one another. It is also found that straw can become wrapped around the rear rotor bearings but that this is substantially prevented by providing an anti-wrap member 190 (FIG. 12) on the rear end of each beater 157. This can also apply to the extension 184 of the beaters of the arrangement of FIG. 9. The anti-wrap member 190 acts in the manner of a partial auger flight to feed straw away from the rear end of the associated rotor.

In all the foregoing embodiments air control discs may be provided to the rotors 74 for increasing the rate of handling of grain by the grain pan 37 and the separation of the grain and chaff by the grain cleaning means 9. Such air discs may be formed by radial or tapered discs secured to the base units 134 preferably at the location of the separating section 121 and extending inbetween the neighbouring separating elements 155 whereby the free passage in axial direction between the base unit 134 and the housing 57 is restricted. In axial flow type combine according to the present invention, the rotors 74 draw air up through the crop elevator 25. Thereby also dirt and dust is drawn up so that the space around and above the header 11 and elevator 25 is clear and the operator can see the header 11 and field. The drawn in air is deflected by the threshing and separating members 141 and 155 and by the air control discs and is forced out through the concaves 72 onto the grain pan 37 and the space above the grain pan 37, whereby the light chaff is airborne and blown directly into the airstream from the cleaning fan 36, which extends rearwardly and upwardly through the cleaning sieves 35, 36. Essentially the air flow from the rotors 74 partially cleans the grain and helps force it of the grain pan 37. Thus grain is handled at a greater rate with a more rapid delivery of grain to the sieves.

What is claimed is:

1. An axial flow type harvesting machine such as a combine harvester having a generally fore-and-aft extending axial flow type threshing and separating mechanism comprising:
    a generally fore-and-aft extending casing;
    a concave provided in said casing;
    rotor means mounted in said casing, the rotor means having a generally cylindrical body portion;
    at least one threshing member extending from the surface of said body portion for cooperating with said casing to operate on the crop material to be harvested, the threshing member having an outer rasp bar section and an inner support section, the height of the support section being substantially larger than the height of the rasp bar section and substantially smaller than the radius of the generally cylindrical body portion.

2. An axial flow type harvesting machine as set forth in claim 1 in which each inner support section includes a top wall spaced from the periphery of the rotor body portion and, relative to the direction of rotation, a rearwardly and upwardly inclined front wall, said rasp bar being mounted on said top wall.

3. An axial flow type harvesting machine such as combine harvesters having generally fore-and-aft extending axial flow type threshing and separating mechanisms; comprising
    crop elevator means for conveying crop material upwardly and rearwardly;

generally fore-and-aft extending casing means of generally cylindrical cross section, said casing means having a front threshing concave and a rear separating grate; and rotor means rotatably mounted in said casing means and cooperable with said casing means upon rotation for providing a smooth flow of crop material through said casing means in a generally spiral path, said rotor means including a generally cylindrical body means having no protrusions or apertures about which crop material can hook, said threshing means forming pocket means with the casing means and the surface of the generally cylindrical body means, the depth of the pocket means being such that during rotation of the rotor means within the casing means they are sufficiently great to permit the pressure on the mat of crop material to be eased to allow threshed grain to fall there from and also to accommodate ears of corn, and sufficiently shallow to maintain ears of corn in substantially constant contact with the casing means and to prevent crop material from lodging therein or roping as it passes through said casing means whereby a fluent flow of crop material through the threshing and separating mechanism is achieved.

4. An axial flow type harvesting machine as set forth in claim 3 further characterized by the provision of a plurality of separating elements equal in number to the threshing means, the separating elements being mounted on and extending radially outwardly from the surface of the generally cylindrical body portion immediately rearwardly of said threshing means, said separating elements having no protrusions or apertures about which crop material can hook, and there being a smooth transition between the threshing means and the separating elements.

5. An axial flow type harvesting machine as set forth in claim 3 wherein the diameter of the circle generated by the threshing means during rotation of the rotor is substantially equal to the diameter of the circle generated by the separating elements during the rotation of the rotor.

6. A rotor for use in an axial flow type harvesting machine having a generally fore-and-aft extending axial flow type threshing and separating mechanism, said rotor having an increased strength-to-weight ratio and comprising:

forward and rear stub shafts axially spaced away from each other;

forward flange means mounted on the forward stub shaft;

rear flange means mounted on the rear stub shaft;

fore-and-aft extending arcuate plates mounted on and extending between the forward and rear flange means to form a generally cylindrical body portion; and radially outwardly extending forward threshing members and rearward separating members mounted on said arcuate plates.

7. A rotor as set forth in claim 6 in which said arcuate plates are spaced apart to provide a service opening to the interior of the generally cylindrical body portion, and further characterized by the provision of service panels mounted over said service openings.

8. A rotor as set forth in claim 6 in which at least one of said forward threshing members and rearward separating members is disposed spirally about said rotor.

9. A rotor as set forth in claim 6 in which said separating members include a forward portion mounted spirally about said rotor and a rear end portion extending generally parallel to the rotor axis for use to discharge material from the separating section generally tangentially of the rotor.

10. The rotor as set forth in claim 6 in which said forward threshing members include
threshing elements for threshing the crop material, and
support means mounted on said body portion for spacing the threshing elements from said body portion, said support means including a generally channel shaped member having inclined forward and rearward portions and an intermediate portion spaced away from said arcuate plates, said threshing elements being mounted on said intermediate portion.

11. A rotor as set forth in claim 10 in which said support means further include outwardly turned front and rear flanges which are secured to said arcuate plates.

12. An axial flow type harvesting machine such as combine harvesters having a generally fore-and-aft extending axial flow type threshing and separating mechanism comprising:

generally fore-and-aft extending casing means of generally cylindrical cross section, said casing means having a front threshing concave and a rear separating grate;

rotor means rotatably mounted in said casing means and cooperable with said casing means upon rotation for providing a smooth flow of crop materials through said casing means in a generally spiral path;

said rotor means including a generally cylindrical body portion and a plurality of threshing members extending radially outwardly from the surface of the generally cylindrical body portion;

feed section means mounted on said rotor forwardly of said threshing members for rotation therewith; and crop elevator means mounted on said machine for conveying a mat of crop material upwardly and rearwardly to said feed section means, said feed section means being operable to deflect the mat of received crop material into a spiral path, the radius of which corresponds generally to the radius of the threshing members;

said feed section means having a base portion and auger flights mounted on said base portion, there being as many auger flights as there are threshing members, the diameter of the base portion of the feed section adjacent to the body portion of the rotor being substantially the same as the diameter of the generally cylindrical body portion of the rotor and wherein the diameter of the auger flights adjacent to the body portion of the rotor is substantially equal to the diameter of the circle described by the threshing members during rotation of the rotor means.

13. An axial flow type harvesting machine as set forth in claim 12 further characterized by the provision of elements having substantially the same cross sectional shape and area as the threshing members for bridging the space between each threshing member and the associated auger flight which ends behind, relative to the direction of rotation of said threshing member.

14. An axial flow type harvesting machine as set forth in claim 12 in which said base portion includes a cylindrical portion and a conical extension.

15. An axial flow type harvesting machine as set forth in claim 14 in which said cylindrical portion is disposed adjacent to the generally cylindrical body portion of the rotor, the auger flights overlying the length of said cylindrical portion having a substantially constant diameter.

16. An axial flow type harvesting machine as set forth in claim 14 in which said conical extension is disposed adjacent to the generally cylindrical body portion of the rotor, the auger flights overlying the length of said conical extension having a substantially constant diameter.

17. An axial flow type harvesting machine as set forth in claim 12 in which the forward edges of the auger flights are in close relationship to the crop elevator means so that the flights have an aggressive grasp on the straw mat in order to continuously clear away the crop material from the crop elevator means to prevent any backfeeding.

18. An axial flow type harvesting machine such as a combine harvester having generally fore-and-aft extending axial flow type threshing and separating type mechanism comprising:

generally fore-and-aft extending casing means of generally cylindrical cross section, said casing means having a front threshing concave and a rear separating grate;

rotor means rotatably mounted in the said casing means and cooperable with said casing means upon rotation for providing a smooth flow of crop material through said casing means in a generally spiral path, said rotor means including generally cylindrical body means having no protrusions or apertures about which crop material can hook, and a plurality of threshing means mounted on and extending radially outwardly from the surface of the generally cylindrical body means, said threshing means having no protrusions or apertures about which crop material can hook, said threshing means forming pocket means with the casing means and the surface of the generally cylindrical body means, the depth of the pocket means being such that during rotation of the rotor means within the casing means they are sufficiently great to permit the pressure on the mat of crop material to be eased to allow threshed grain to fall therefrom and also to accommodate ears of corn, and sufficiently shallow to maintain ears of corn in substantially constant contact with the casing means and to prevent crop material from lodging therein or roping as it passes through said casing means whereby a fluent flow of crop material through the threshing and separating mechanism is achieved;

feed section means mounted on said rotor means forwardly of said threshing means for rotation therewith; and crop elevator means mounted on said machine for conveying a mat of crop material upwardly and rearwardly to said feed section means, said mat of crop material being delivered below the rotational axis of said feed section means, and said feed section means being operable to deflect the mat of received crop material into a spiral path, the radius of which generally corresponds to the radius of the threshing members;

said feed section means having a base portion and auger flights mounted on said base portion, there being as many flights as there are threshing means, the diameter of the base portion of the feed section means adjacent to the body means of the rotor means being substantially the same as the diameter of the generally cylindrical body means of the rotor means and wherein the diameter of the auger flights adjacent to the body means of the rotor means is substantially equal to the diameter of the circle described by the threshing means during rotation of the rotor means whereby a smooth transition of the mat of crop material from the feed section means towards the threshing means is ensured.

* * * * *